No. 746,825. Patented December 15, 1903.

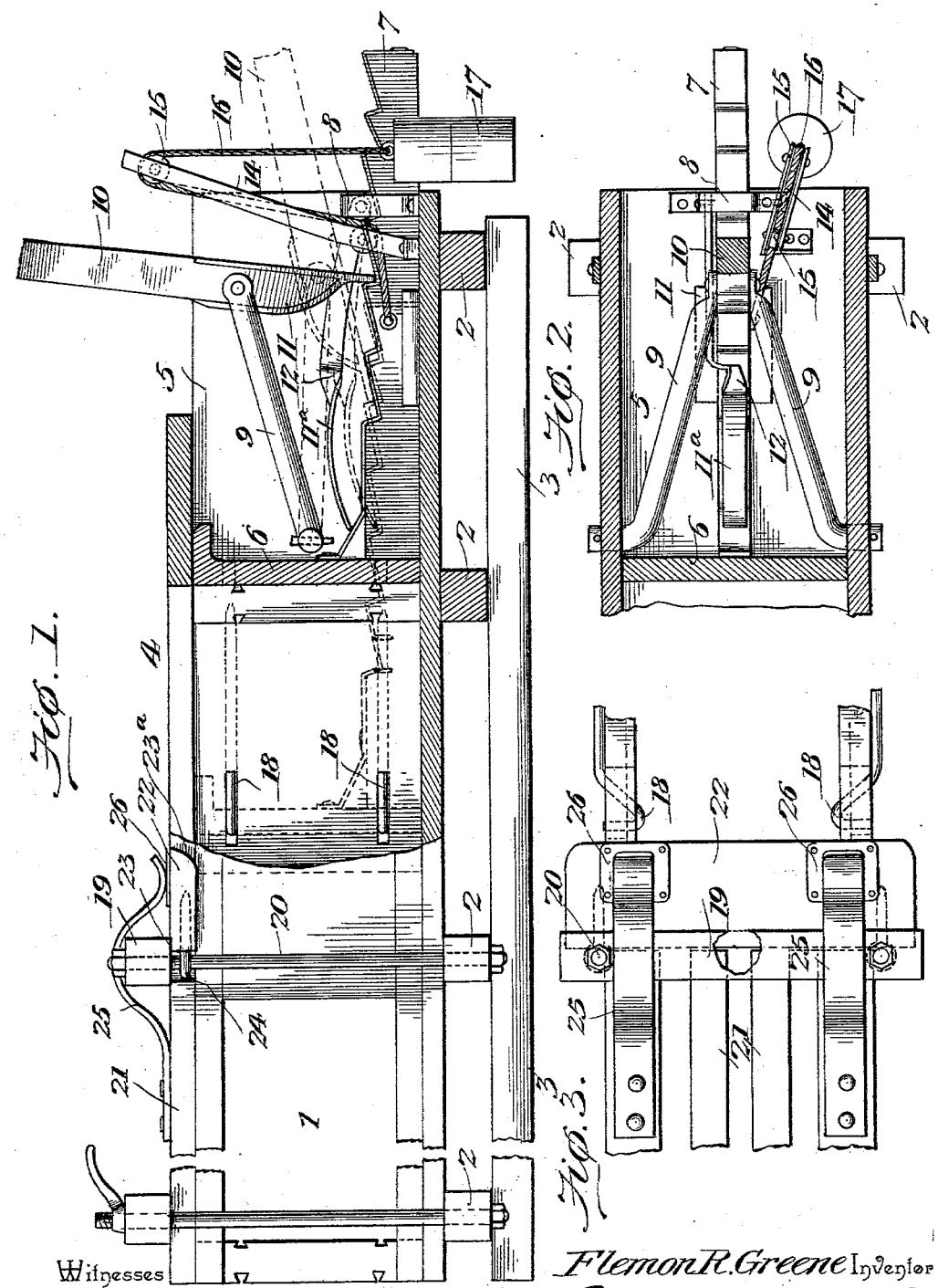

UNITED STATES PATENT OFFICE.

FLEMON R. GREENE, OF HUMBOLDT, TENNESSEE.

HAY-PRESS.

SPECIFICATION forming part of Letters Patent No. 746,825, dated December 15, 1903.

Application filed August 4, 1903. Serial No. 168,225. (No model.)

*To all whom it may concern:*

Be it known that I, FLEMON R. GREENE, a citizen of the United States, residing at Humboldt, in the county of Gibson and State of Tennessee, have invented a new and useful Hay-Press, of which the following is a specification.

This invention relates to hay-presses; and it has for its object to provide a press of this character capable of being operated by manual power and in which provision shall be made for the automatic return of the plunger whenever desired, usually when the charge of hay has been forced within the press-box past the retaining devices.

Another object of my invention is to provide the press-box with guiding means for guiding the charge of hay into the body of the box without danger of its becoming entangled at the top of the box, as is frequently the case, especially when the press is overfed.

With these and other ends in view my invention consists in certain improvements in the construction and arrangement of parts having for their object to provide a device of the class described which shall possess superior advantages in point of simplicity, durability, and general efficiency, as will be hereinafter fully described, and particularly pointed out in the claims.

In the accompanying drawings, Figure 1 is a side elevation, partly in section, of a baling-press constructed in accordance with the principles of my invention. Fig. 2 is a detail plan view of the operating portion of the machine. Fig. 3 is a detail plan view of the deflecting device constituting a part of my invention.

Corresponding parts in the several figures are indicated by similar numerals of reference.

1 designates the press-box, which is mainly of ordinary construction, being supported upon cross-pieces 2, resting upon sills 3, and means being provided whereby the top and bottom at the discharge end of the box may be compressed, so as to retard the passage of the bales as they issue from the box, thereby furnishing the tension necessary for the formation of new bales.

4 designates the receiving-chamber of the press-box, and 5 the front end of the latter, within which the plunger and the mechanism for operating the same is located. The plunger 6 is provided with a forwardly-extending ratchet-bar 7, which is supported upon the bottom of the press-box and which is guided through a bail 8 at the front end of the box, which while it admits of the free movement of said ratchet-bar prevents it from springing out of place.

9 9 designate a pair of arms which are pivotally connected with the sides of the press-box within the latter and which converge forwardly, as shown. Between the front ends of these arms is pivotally mounted an operating-lever 10, having a shoe 11, adapted to engage the ratchets of the bar 7. This lever, which is to be of considerable length, may be manipulated so as to engage the ratchet-bar of the plunger, which latter may thus be forced in a rearward direction to compress the charge of hay previously placed in the receiving-chamber 4.

To prevent the plunger from being returned by the back pressure of the hay, I provide a pawl 11$^a$, which is pivotally connected with the bail 8 and which extendes rearwardly, being provided with a shoulder 12 extending laterally above the ratchet-bar 7 and being from thence extended rearwardly to form a toe engaging the ratchets of said bar. This pawl, which is of considerable length, is also sufficiently heavy to automatically engage the said ratchet-bar, and I thus avoid the use of springs and other devices tending to complicate the construction. At the front end of the press-box is an inclined upright 14, provided near its upper and lower ends with guiding means 15, over which is guided a flexible element, such as a rope 16, one end of which is connected with one side of the ratchet-bar 7 and the other end of which carries a weight 17, sufficiently heavy to return the plunger and ratchet-bar to the front end of the press when disengaged from the lever and pawl 10 11$^a$.

The sides of the receiving-chamber are provided with spring-actuated retainers 18 of ordinary construction to prevent the compressed hay from backing into the receiving-chamber. Above the latter is disposed a cross-piece 19, connected, by means of bolts 20, with one of the cross-pieces 2, supporting the bottom of the press-box. The top 21 of the compressing-chamber terminates under the said cross-piece 19, and 22 designates a top deflecting-plate, which is fitted in recesses 23 in the sides of the receiving-chamber and the under side of which is flush with that of the top of the press-box. This deflecting-piece 22 has a beveled front edge 23ª, and it is connected, by means of eyes 24, with the bolts 20, so that it has a limited hinge movement. Said deflecting-piece is, however, normally forced in a downward direction by means of leaf-springs 25, mounted upon the top of the press-box, curved over the cross-piece 19 and downwardly against the top of the deflector 22, which is provided with wear-plates 26, supporting the ends of said springs.

The operation and advantages of my improved hay-press will be readily understood from the foregoing description, taken in connection with the drawings hereto annexed. The operating-lever 10 is normally in a raised position, engaging the ratchet-bar 7 of the plunger 6. When the latter is withdrawn to the front end of the receiving-chamber, said chamber may be filled with hay, a head-block having previously been placed in the press-box in the usual manner. When the receiving-chamber has been filled, the lever 10 is manipulated to force the plunger in a rearward direction, thus compressing the hay in the receiving-chamber and forcing it into the press-box. When the plunger 6 has reached the limit of its movement, the lever 10 is completely depressed, thus causing the toe thereof to engage the shouldered portion 12 of the pawl 11ª, the latter being thus elevated out of engagement with the ratchet-bar, which latter, together with the plunger, will now by the counterweight 17 be restored to its original position for a repetition of the operation. The hay which is compressed in the receiving-chamber will readily pass under the beveled edge of the deflector 22, which latter, moreover, will yield upwardly, thus interposing no direct obstruction to the passage of the hay from the receiving-chamber into the press-box proper, a feature which is of special importance and value in a press which, like the present one, is mainly intended and adapted to be operated by manual power and where it is of course important to avoid frictional and other obstructions as far as may be possible. The features of my invention, however, are not applicable to presses only operated by manual power, but may be readily applied to presses of larger capacity intended and adapted to driven mechanically or by horse-power.

The simplicity of my improved press enables it to be manufactured and placed on the market at a moderate expense, and while it is simple and composed of comparatively few parts it will be found to be extremely efficient in operation.

I desire it to be understood that while I have in the foregoing described a simple and preferred form of embodiment of my invention I do not necessarily limit myself to the precise structural details herein shown and described, but reserve the right to any changes, alterations, and modifications which may be resorted to within the scope of my invention and without departing from the spirit or sacrificing the utility of the same.

Having thus described my invention, I claim—

1. In a hay-press, a plunger, a ratchet-bar connected with said plunger, a bail confining said ratchet-bar, a pawl pivotally connected with said bail and having a shouldered offset extending across the ratchet-bar and terminating in a toe engaging the ratchets, in combination with an operating-lever engaging the ratchet-bar and adapted to engage the shouldered portion of the pawl.

2. In a hay-press, a plunger, a ratchet-bar connected with the same, a bail confining said ratchet-bar, a pawl pivotally connected with said bail, said pawl having a shouldered portion extending across the ratchet-bar and terminating in a toe engaging the latter, a lever engaging the ratchet-bar and adapted to engage the shouldered portion of the pawl, and means for restoring the plunger and ratchet-bar to initial position when the pawl is raised by the lever from engagement with said ratchet-bar.

3. In a baling-press, a beveled deflecting-plate seated in recesses in the sides of the receiving-chamber in alinement with the top of the press-box, cross-pieces above the top and below the bottom of the press-box, the upper cross-piece being disposed above the meeting edges of the deflector and the top of the press-box, bolts connecting said cross-pieces, flexible connecting means between said bolts and the deflector, and leaf-springs secured upon the top of the press-box and depressing said deflector.

4. In a baling-press, a flexibly-mounted deflector disposed above the receiving-chamber and in alinement with the top of the press-box, a cross-brace disposed above the meeting edges of said deflector and the top of the press-box, and leaf-springs mounted upon the latter, curved over the cross-piece and bearing downwardly against the deflector.

In testimony that I claim the foregoing as my own I have hereto affixed my signature in the presence of two witnesses.

FLEMON R. GREENE.

Witnesses:
 J. H. JOCHUM, Jr.,
 ALFRED B. DENT.